US010561151B2

(12) United States Patent
Gillespie et al.

(10) Patent No.: US 10,561,151 B2
(45) Date of Patent: Feb. 18, 2020

(54) OFFSET WEIGHING APPARATUS

(71) Applicant: Baader Linco, Inc., Kansas City, KS (US)

(72) Inventors: Joshua J. Gillespie, Smithville, MO (US); Ryan W. O'Dell, Weatherby Lake, MO (US); Gerald Kent Lauer, Lee's Summit, MO (US); Douglas Bryan Barnett, Olathe, KS (US); Kenneth Darrell Pinkston, Carthage, TX (US)

(73) Assignee: Baader Linco, Inc., Kansas City, KS (US)

( * ) Notice: Subject to any disclaimer, the term of this patent is extended or adjusted under 35 U.S.C. 154(b) by 35 days.

(21) Appl. No.: 15/489,612

(22) Filed: Apr. 17, 2017

(65) Prior Publication Data

US 2017/0299421 A1  Oct. 19, 2017

Related U.S. Application Data

(60) Provisional application No. 62/323,442, filed on Apr. 15, 2016.

(51) Int. Cl.
*A22B 5/00* (2006.01)
*A22C 21/00* (2006.01)
(Continued)

(52) U.S. Cl.
CPC ........ *A22B 5/0064* (2013.01); *A22C 21/0007* (2013.01); *A22C 21/0053* (2013.01);
(Continued)

(58) Field of Classification Search
CPC ...... G01G 11/003; G01G 19/02; G01G 19/03; G01G 19/06; G01G 19/14; G01G 19/18;
(Continued)

(56) References Cited

U.S. PATENT DOCUMENTS 3,805,904 A * 4/1974 Zimmerer ................ G01G 9/00
177/1
4,165,975 A * 8/1979 Kwiatkowski ........... G01G 9/00
177/1

(Continued)

OTHER PUBLICATIONS

European Search Report, Application No. EP 17783375.3, dated Nov. 8, 2019, issued by European Patent Office, Munich, Germany, 7 pgs.

*Primary Examiner* — Randy W Gibson
(74) *Attorney, Agent, or Firm* — Spencer Fane LLP (57) ABSTRACT

An offset weighing apparatus and method for use with poultry processing equipment includes a weigh assembly to weigh an animal connected to a shackle assembly as the shackle moves in contact with a force sensor along a conveyor line. A diverter assembly laterally displaces a shackle retaining the animal from below the conveyor line into engagement with the force sensor. The bending axis of the force sensor is approximately parallel to the displaced shackle. The angular position of the bending axis and shackle, and relative positions, friction, and forces of the components of the shackle assembly and weigh assembly are analyzed to calculate the weight of the animal connected to the shackle without removing the animal from the shackle or ceasing movement of the conveyor line.

16 Claims, 8 Drawing Sheets

(51) Int. Cl.
*G01G 19/06* (2006.01)
*G01G 19/18* (2006.01)
*G01G 23/06* (2006.01)
*B07C 5/16* (2006.01)
*B07C 5/18* (2006.01)

(52) U.S. Cl.
CPC ............. *G01G 19/06* (2013.01); *G01G 19/18* (2013.01); *B07C 5/16* (2013.01); *B07C 5/18* (2013.01); *G01G 23/06* (2013.01)

(58) Field of Classification Search
CPC . G01G 23/06; G01G 9/00; B07C 5/16; B07C 5/18; A22B 5/0064; A22C 21/0007; A22C 21/0053
See application file for complete search history.

(56) References Cited

U.S. PATENT DOCUMENTS

| | | | |
|---|---|---|---|
| 4,187,945 A | | 2/1980 | Altenpohl et al. |
| 4,282,633 A | | 8/1981 | Graham et al. |
| 4,300,644 A | | 11/1981 | Meyn |
| 4,488,635 A | | 12/1984 | Linville |
| 4,593,778 A | * | 6/1986 | Konishi .............. G01G 23/06 177/185 |
| 5,219,031 A | * | 6/1993 | Brandt, Jr. ............. G01F 1/30 177/145 |
| 5,455,395 A | * | 10/1995 | Hafner ................. G01G 11/00 141/83 |
| 5,569,887 A | * | 10/1996 | Naito ................... G01G 23/10 177/184 |
| 5,594,184 A | * | 1/1997 | Schroder ............. A24C 5/3424 177/1 |
| 7,572,176 B2 | | 8/2009 | Petersen et al. |
| 8,013,261 B2 | * | 9/2011 | De Leo ............... G01G 19/005 177/1 |
| 9,766,113 B2 | * | 9/2017 | Trakhimovich ..... G01G 3/1412 |
| 2006/0076165 A1 | * | 4/2006 | Winkelmolen ........ G01G 13/02 177/145 |

\* cited by examiner

OFFSET WEIGHING APPARATUS

CROSS-REFERENCE TO RELATED APPLICATIONS

This application claims priority in U.S. Provisional Application No. 62/323,442, filed Apr. 15, 2016, entitled Offset Weighing Apparatus, the contents of which are hereby incorporated by reference.

BACKGROUND

1. Field of the Invention

The disclosed subject matter relates generally to a weighing apparatus, in particular an offset weighing apparatus for weighing an animal suspended from a shackle.

2. Background

Animals processed using large scale processing systems pass through various tools and processing equipment. In poultry processing systems, poultry are suspended from a shackle assembly connected to a conveyor system during part of the processing operation as the poultry moves among processing stations. Automated processes determine what poultry carcasses receive processing at particular processing stations. At various points during processing the poultry carcass is weighed. The conventional method involves measuring the weight of the carcass and the associated shackle assembly by elevating both elements vertically as they move along the conveyor system. The conventional method suffers from friction imparting errors into the weigh signal as the shackle assembly moves within the associated shackle support structures.

SUMMARY

An embodiment of the disclosed subject matter includes an apparatus and method for measuring the force required to support a poultry carcass on a poultry shackle using a force sensor, and in turn calculating the weight of the poultry carcass. The force sensor, such as a load cell, includes a contact surface, and the sensor weighs the poultry carcass and the shackle assembly as the shackle moves across the contact surface in contact with the contact surface.

An embodiment of the disclosed subject matter includes an apparatus and method for measuring, using a load cell, the force required to support a poultry carcass on a shackle as the shackle moves along a conveyor line. The load cell is positioned adjacent the conveyor line, and includes an elongated contact surface. The load cell is configured to weigh a poultry carcass on a shackle pivotally connected to the conveyor line and extending across the elongated segment at an acute angle, such as approximately 45 degrees as the shackle moves along the elongated segment.

An embodiment of the disclosed subject matter includes a diverter assembly apparatus and method used in conjunction with a weighing apparatus and method for measuring the force required to support a poultry carcass on a poultry shackle suspended from a conveyor line as the shackle moves along a conveyor line. The diverter assembly is located adjacent and below the conveyor line and includes a weighing apparatus disposed between an off-ramp assembly and an on-ramp assembly. The off-ramp assembly extends from a first end toward a second end, terminating at the weighing apparatus. The on-ramp assembly extends from the second end toward the first end, terminating at the weighing apparatus. The weighing apparatus includes an elongated segment connected to a load cell, with the elongated segment extending between the off-ramp and the on-ramp. The load cell is configured to calculate the weight of a poultry carcass and a poultry shackle suspended from the conveyor line as the poultry shackle extends across the elongated segment at an acute angle, such as approximately 45 degrees as the shackle moves in contact and across the elongated segment of the load cell.

An embodiment of the disclosed subject matter includes a poultry processing apparatus and method utilizing a conveyor assembly with a plurality of shackle assemblies suspended from a conveyor line, and a diverter assembly in conjunction with a weighing apparatus for measuring the force required to support a poultry carcass on a poultry shackle suspended from the conveyor line as the shackle moves along a conveyor line. Each shackle assembly has a shackle pivotally extending from the conveyor line. In general, the conveyor line is aligned along a vertical plane extending downward from the conveyor line, the vertical plane aligned with the path the poultry shackles travel as the shackles hang vertically beneath the conveyor line. The diverter assembly is located adjacent and below the conveyor line and includes a weighing apparatus disposed between an off-ramp assembly and an on-ramp assembly. The diverter assembly has a guardrail extending from a first end to a second end parallel to the conveyor line. The off-ramp extends from the first end toward the second end, terminating at the weighing apparatus. The on-ramp extends from the second end toward the first end, terminating at the weighing apparatus. The weighing apparatus includes an elongated segment connected to a load cell, with the elongated segment extending between the off-ramp and the on-ramp. The load cell has a bending axis forming a bending axis plane, and is configured to calculate the weight of a poultry carcass and a poultry shackle suspended from the conveyor line as the shackle extends across and moves across the elongated segment in contact with the elongated segment at an acute angle. The acute angle is a downward angle formed between the vertical plane and the bending axis plane. In an implementation, the downward angle is approximately 45 degrees.

In an embodiment, the diverter assembly is adjacent a poultry processing tool, and a process control apparatus diverts a shackle assembly into engagement with the off-ramp, circumventing the processing tool.

Weighing the poultry carcass on a shackle assembly at a 45 degree angle, parallel to the bending axis of the load cell, minimizes the effect of friction, and the amount of reduction of friction can be calculated.

BRIEF DESCRIPTION OF THE DRAWINGS

The present disclosed subject matter is described herein with reference to the following drawing figures, with greater emphasis being placed on clarity rather than scale.

DETAILED DESCRIPTION

Embodiments of the offset weighing apparatus are shown in the drawing figures, and are disclosed in the following detailed description and claims. Referring to the drawings, FIGS. 1-8 show a weighing apparatus 152 embodying aspect of the disclosed subject matter. The weighing apparatus 152 is used with a diverter assembly 102. The diverter assembly 102 diverts a shackle assembly 206 depending from a conveyor line 204, and the poultry carcass 240 suspended therefrom, laterally away from beneath the conveyor line 204, or away from a tool, allowing the carcass 240 to be weighed by a force sensor as the shackle assembly 206 continues to move along a conveyor assembly 202. The diverter assembly 102 is located adjacent the conveyor line 204, or the tool. The tool may be any manner of poultry processing tool, including a wing segmenter, a precutter, a front half cutter, a tail cutter, a leg processor, a saddle splitter, a drum and thigh cutter, or a leg unloader.

A series of shackle assemblies 206 are connected to each other by supports, such as a chain 224, as they move along the conveyor line 204 of the conveyor assembly 202 in the direction of arrow 248 (the direction of the +X-axis). Only one shackle assembly 206 is shown and described herein to simplify discussion of the disclosed subject matter. The XYZ coordinates are indicated in FIGS. 1, 3-4, and 8. A vertical plane 250 is defined by the XY plane extending vertically through the conveyor line 204. The vertical plane 250 is aligned with the path of travel of poultry shackles 206 as the shackles hang vertically beneath the conveyor line 204. The shackle assembly 206 pivots relative to the conveyor line 204 allowing offset weighing of the poultry carcass 240 connected thereto as the shackle assembly 206 moves in contact with a weighing apparatus 152. In an embodiment, each shackle assembly 206 includes a shackle 226 suspended from a headset 208.

The headset 208 is pivotally connected to a lead support 212 and a follow support 218. The lead support 212 includes a pair of wheels 216 rollingly-engaging the conveyor line 204. In an embodiment, the conveyor line 204 is formed from a length of an inverted T-shaped rail with the wheels 216 positioned on opposite lateral arms of the T-shaped rail. The wheels 216 support an arm 213 depending therefrom forming an aperture 214 for rotatably receiving a first end of the headset 208. The follow support 218 includes a pair of wheels 222 rollingly-engaging the conveyor line 204 in the same manner as wheels 216 above. An arm 219 depends from the wheels 222 forming an aperture 220 for rotatably receiving a second end of the headset 208.

The T-shaped rail is suspended from an upper support 242 connected to the frame 244. In an embodiment, the frame 244 is tubular and includes vibration attenuating material 246 within to dampen transmission of vibrations from the conveyor assembly 202 through the shackle assembly 206 to the weighing apparatus 152, thereby minimizing the effect of vibrations in the weight determination involving the force sensor. In an implementation, the vibration attenuating material is rubber adhered to the interior of the tubular frame 244. In an implementation the vibration attenuating material 246 is loose granular material, such as sand, that dissipates vibration as the energy moves through the loose granular material. In another implementation, the vibration attenuating material 246 is a compressible material, such as rubber, that absorbs vibration as it is compressed. In an implementation, the frame 244 is not hollow but a solid material, such as a metal bar.

The headset 208 forms a crossbar 228 with a first end received within aperture 214, and a second end received within aperture 220, and an upper opening 209 aligned with a lower opening 211 for slidably receiving the shackle 226. The shackle 226 extends from a first end at the headset 208 to a second end with a force sensor contact 238 transitioning into a pair of stirrups 232 for receiving the legs 241 of a poultry carcass 240. In an implementation, a sleeve 230 manufactured from nylon is disposed about the shackle 226 above the stirrups 232, the sleeve 230 forming a sidewall 234 with an outer geometric configuration allowing the shackle 226 and stirrups 232 to be rotated when the sleeve 230 engages an object. For example, sleeve 230 is shown with spiral shaped sidewalls 234 extending between a rectangular first end 236 below the headset 208 and rectangular second end 238 above the stirrups 232, the second end forming the force sensor contact. Although shackle assembly 206 is shown and described it is understood that shackle assemblies of various configurations can be used with the instant weighing apparatus 152, such as shackle assemblies that can be deflected laterally from their travel path and that have shackles with a surface that can contact a force sensor.

The T-shaped rail is suspended from an upper support 242 connected to the frame 244. In an embodiment, the frame 244 is tubular and includes vibration attenuating material 246 within to dampen transmission of vibrations from the conveyor assembly 202 through the shackle assembly 206 to the weighing apparatus 152, thereby minimizing the effect of vibrations in the weight determination involving the force sensor. In an implementation the vibration attenuating material 246 is loose granular material, such as sand, that dissipates vibration as the energy moves through the loose granular material. In another implementation, the vibration attenuating material 246 is a compressible material, such as rubber, that absorbs vibration as it is compressed. The rubber may be adhered to the interior of the tubular frame 244. In an implementation, the frame 244 is not hollow but a solid material, such as a metal bar.

During poultry processing, shackle assemblies 206 with poultry carcasses 240 suspended therefrom move along the conveyor assembly 202 along a travel path in the direction of arrow 248 toward the diverter assembly 102. Referring to FIGS. 1-4, an embodiment of a diverter assembly 102 is shown and described. Diverter assembly 102 includes an off-line portion 101 that extends from a first end 120 to a second end 122, generally forming a segmental arch-shaped track between the first end 120 and second end 122. The diverter assembly 102 first guides a shackle assembly 206 advancing in the direction of arrow 248 laterally away from a position beneath the conveyor line 204 into engagement with a force sensor, and back into a position beneath the conveyor line 204 after contacting the force sensor. Diverting the shackle assembly 206 laterally moves the stirrups 232, and the poultry carcass 240 laterally from alignment with the vertical plane 250. In an embodiment, the diverter assembly 102 and weigh apparatus 152 are adjacent a conveyor line 204 and displace the stirrups 232 generally in the Z-axis direction and Y-axis direction away from the vertical plane 250.

The weighing apparatus 152 is located lower than the conveyor line 204 to create the angular displacement of the shackle assembly 206. The weighing apparatus 152, off-ramp 104, and on-ramp 114 are connected to the frame 244 of the conveyor assembly 202 by a support member 158. In an implementation, the support member 158 is tubular and filled with a vibration attenuating material to dampen vibrations in the system that affect the weighing apparatus 152. As above, the vibration attenuating material may include granular material, such as sand, compressible material, such as rubber, the rubber may be adhered to the interior of the support member 158. In an implementation, the support member 158 is not hollow but a solid material, such as a metal bar.

The off-ramp 104 consists of a first side rail member 106 extending from the first end 120 laterally away from beneath the conveyor line 204 toward the second end 122, terminating in a first segment 108 disposed, parallel to the conveyor line 204, the first segment 108 extending toward the second end 122. The on-ramp 114 consists of a second side rail member 116 extending from the second end 122 laterally away from the guardrail 118 toward the first end 120, terminating in a third segment 112, disposed parallel to the conveyor line 204, the third segment extending toward the first end 120. In an embodiment, the off-ramp 104 and on-ramp 114 are movably secured to the support member 158 allowing adjustment of the ramps 104, 114 in the XYZ coordinates with the position of the second segment 110. In an implementation, the on-ramp 104 and off-ramp 114 are connected to the support member 158 by threaded fasteners, such as wing nuts, allowing adjustment of the ramps.

The weighing apparatus 152 includes the load cell 154 connected to the support member 158 and an elongated bar or second segment 110, the second segment manufactured from metal, including stainless steel. In an embodiment, the force sensor is a load cell 154. In an embodiment, the load cell 154 is an Eilersen SPSX digital single point load cell from Eilersen Electric Digital Systems A/S of Denmark. The load cell 154 is electrically connected to a power supply and operably connected to a computer system. The load cell 154 generates an electrical signal relative to a weight applied to the load cell 154, and the electrical signal is analyzed by the computer system and a weight of the poultry carcass 240 (weight of the bird ($W_B$)) is calculated according to the formula described further below. The second segment 110 extends from a first end 109 to a second end 111, and is orientated parallel to the conveyor line 204 along the x-axis between the first segment 108 and third segment 112. The second segment 110 is in alignment with the first segment 108 and third segment 112, providing a smooth transition for the shackle 226 as it moves across the first segment 108 to the second segment 110, and across the second segment 110 and third segment 112, as the shackle assembly 206 moves along the conveyor line 204 in the direction of the +X-axis. In an embodiment, the load cell 154 is a strain gauge load cell defining a bending axis 155 extending between a first end connected to the second segment 110, and a second end connected to the support member 158. The bending axis 155 extends from the vertical plane 250 in the +Z-axis direction parallel a ZX plane forming a bending plane. In an embodiment, the downward angle θ formed by the intersection of the vertical plane 250 along the −Y-axis with the ZX plane in the +Z-axis direction is an acute angle. In an implementation, the angle θ is approximately 45 degrees, and the supplementary or upward angle formed between the vertical plane 250 along the +Y-axis and the ZX plane in the +Z-axis direction is approximately 135 degrees. In an implementation, vibration attenuating bushings 160 separate the load cell 154 from the support member 158, dampening transmission of vibrations from the conveyor assembly 202 to the load cell 154 and minimizing the influence of vibrations upon the weighing calculation of the poultry carcass 240. In an embodiment, a base plate 162 is connected to the load cell 154. The base plate 162 is connected to the support member 158 by a mounting plate 164. The base plate 162 forms apertures that receive vibration attenuating bushings 160, and the mounting plate 164 forms apertures that receive a threaded member passing through the bushings 160 securing the load cell 154 to the support member 158.

The mounting of the load cell 154 in the disclosed embodiment shows the bending axis 155 generally parallel to the angle of the shackle 226, or at an angle θ defined between the bending axis 155 and the vertical plane 250. In an implementation, the angle θ is increased whereby the load cell 154 is mounted perpendicular, or at ninety degrees to the vertical plane 250. In an embodiment, the non-vibration attenuating components of the weigh apparatus are manufactured from metal, including stainless steel.

As the force sensor contact 230 moves across the second segment 110 in the direction of the +X-axis, the load cell 154 generates a signal. The signal generated by the load cell 154 is used by the computer system to determine the weight of the poultry carcass 240 suspended from the shackle assembly 206, and in turn, yields from the processing of the poultry carcass by individual machines. For example, a poultry processing system can include a processing phase whereby a poultry carcass encounters a first weighing apparatus 152 before encountering a first tool and then encounter a second weighing apparatus 152 after the carcass is operated on by the tool to measure the weight of the carcass before and after the tool operates upon the carcass. In the exemplar processing phase, the carcass first encounters a first load cell 154 of a first weighing apparatus 152 and a first weight of the poultry carcass is determined. Next, the first tool operates on the poultry carcass, for example, to remove the wings. Then, the poultry carcass with the wings removed encounters a second load cell 154 of a second weighing apparatus 152 and a second weight of the carcass is determined. The computer system calculates the difference between the first weight and second weight to determine the yield of the wings from the carcass.

In an embodiment, the differential between the weight of the poultry carcass before and after it is processed by a first tool is used to determine the next steps the poultry carcass will encounter during processing, including what tools operate on the carcass.

In use, the conveyor assembly 202 advances a shackle assembly 206 traveling along the vertical plane 250 under the conveyor line 204 in the direction of arrow 248. As the shackle assembly 206 enters the off-line 101 portion, each shackle 226 is guided laterally away from the vertical plane 250 by the off-ramp 104, rotating the assembly about the apertures 214, 220 as the sleeve 230 engages the first side rail 106 and moves along the first side rail 106 to the first segment 108. In an embodiment, the force sensor contact 230 has a known geometric configuration and dimensions, such as a broad face, wherein the face is in contact with the first side rail 106 as the shackle assembly 206 moves toward the weighing apparatus 152.

As the force sensor contact 238 transitions from the first segment 108 to the second segment 110, the angle θ is approximately 45 degrees. As the force sensor contact 238 moves across the second segment 110, the weight of the poultry carcass 240 suspended from the stirrups 232 is calculated, in part, by factoring in the angle and the relative positions of the components of the shackle assembly 206 and weighing apparatus 152. Orientating the shackle assembly 206 at a 45 degree angle and the bending axis 155 at a 45 degree angle, and manufacturing the force sensor contact 238 out of nylon and the second segment 110 out of stainless steel yields a point of contact 262 between the force sensor contact 238 and second segment 110 resulting in a minimal amount of friction with negligible impact on the weight measurement.

Figure 1:
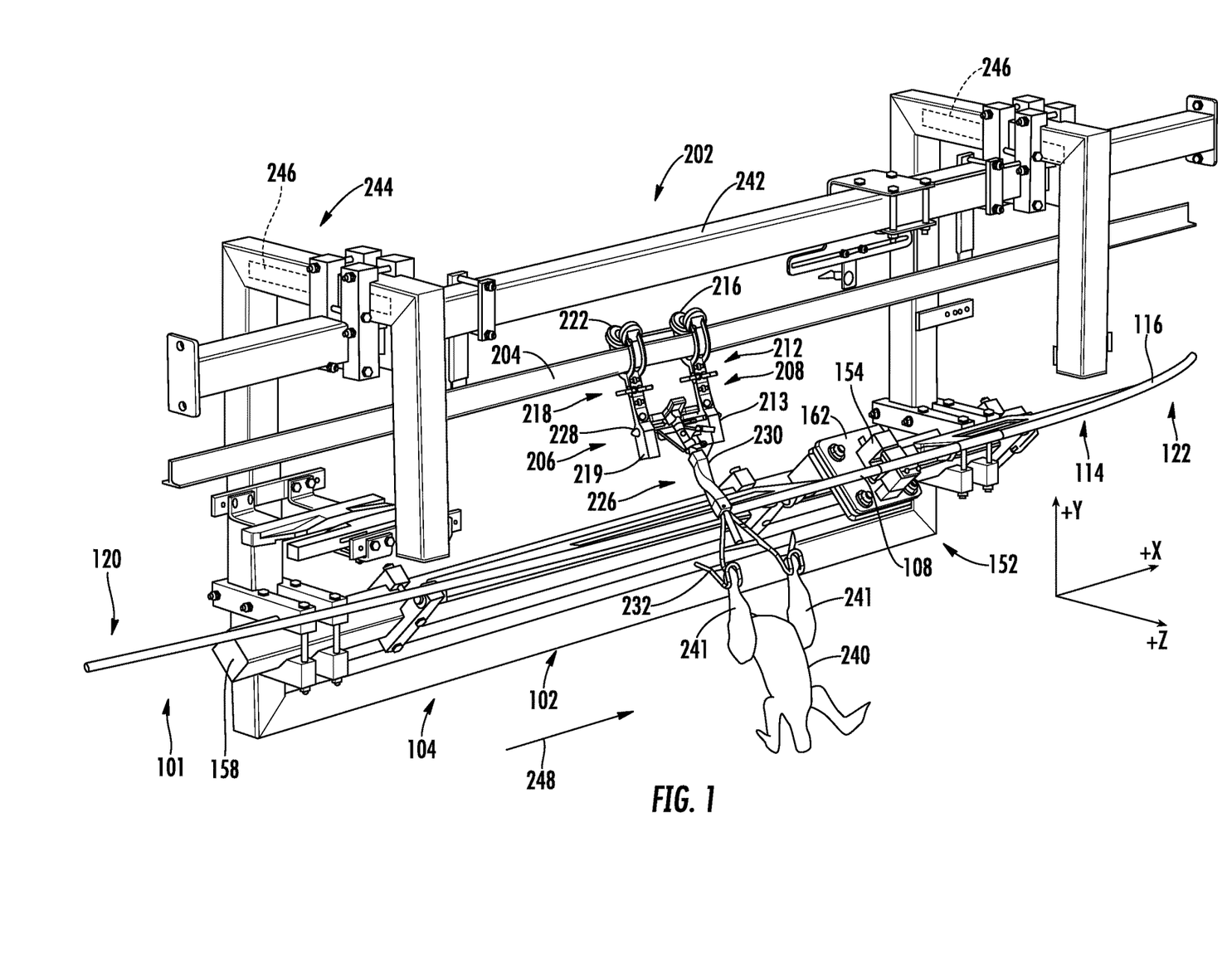
FIG. 1 is a perspective view of an embodiment of the offset weighing apparatus.
Figure 2:
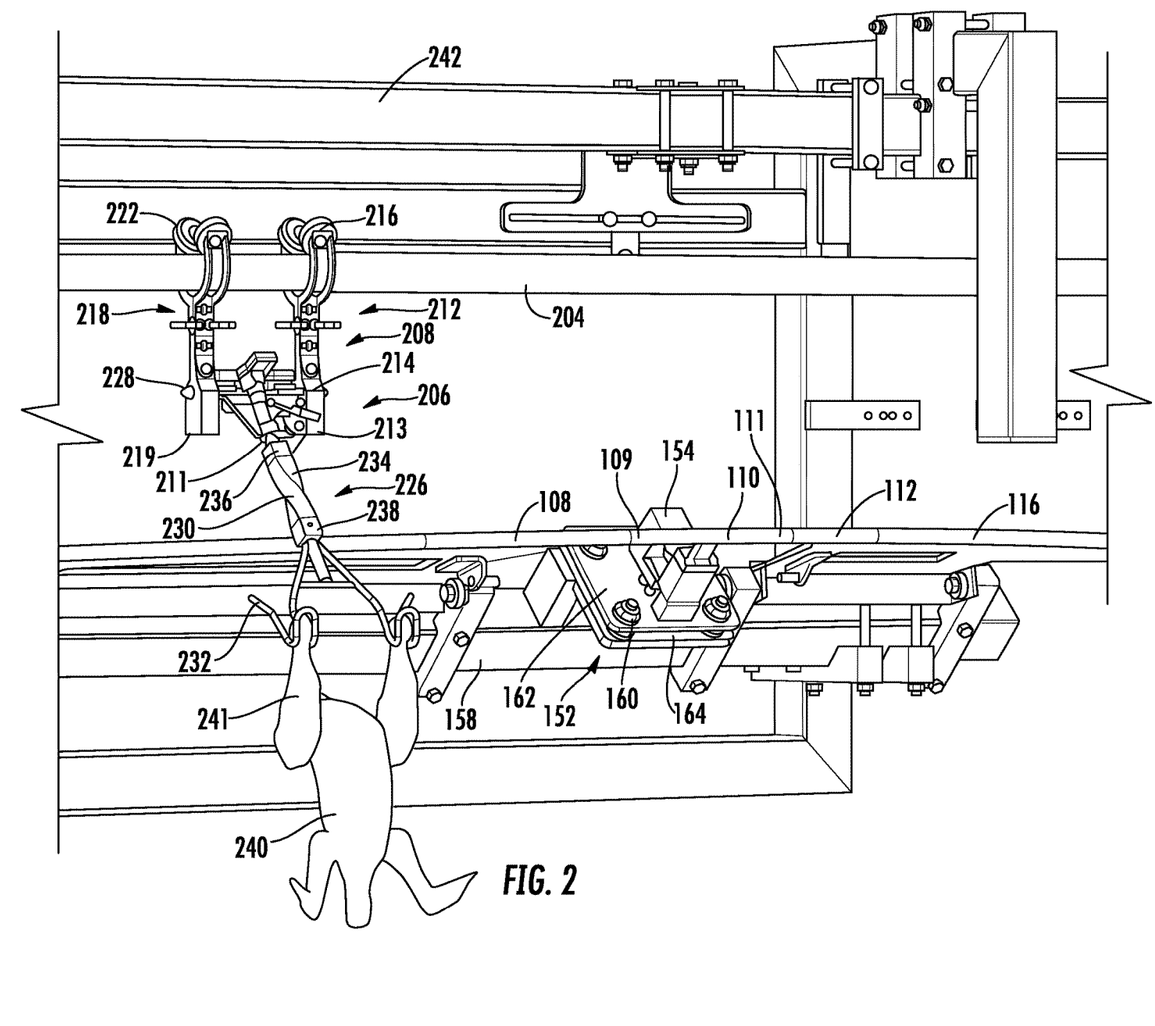
FIG. 2 is a perspective view of an embodiment of the offset weighing apparatus.
Figure 3:
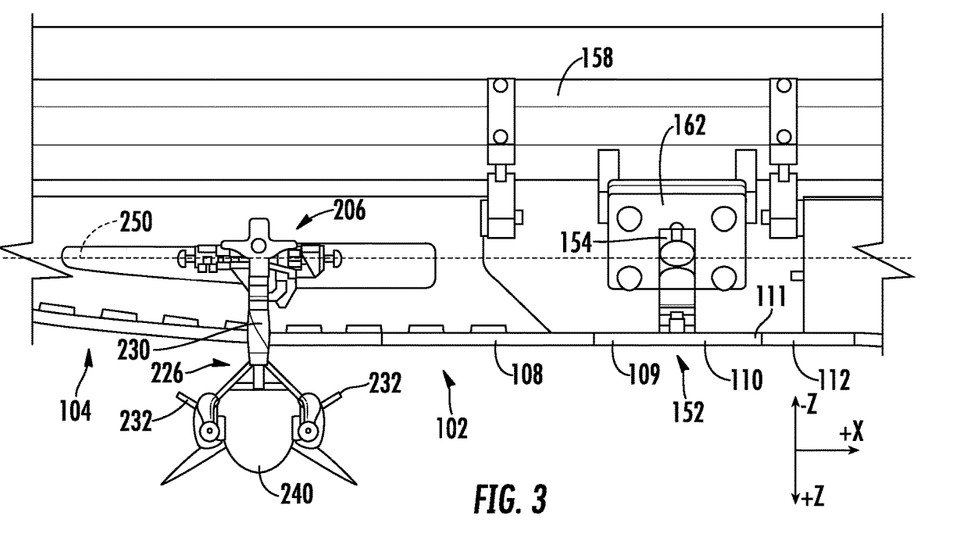
FIG. 3 is a plan view of an embodiment of the offset weighing apparatus.
Figure 4:
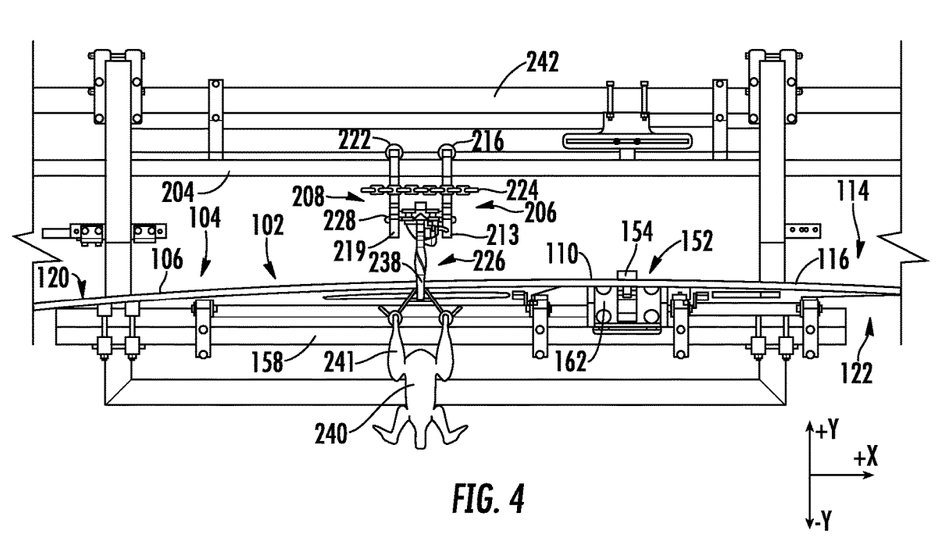
FIG. 4 is an elevation view of an embodiment of the offset weighing apparatus.
Figure 5:
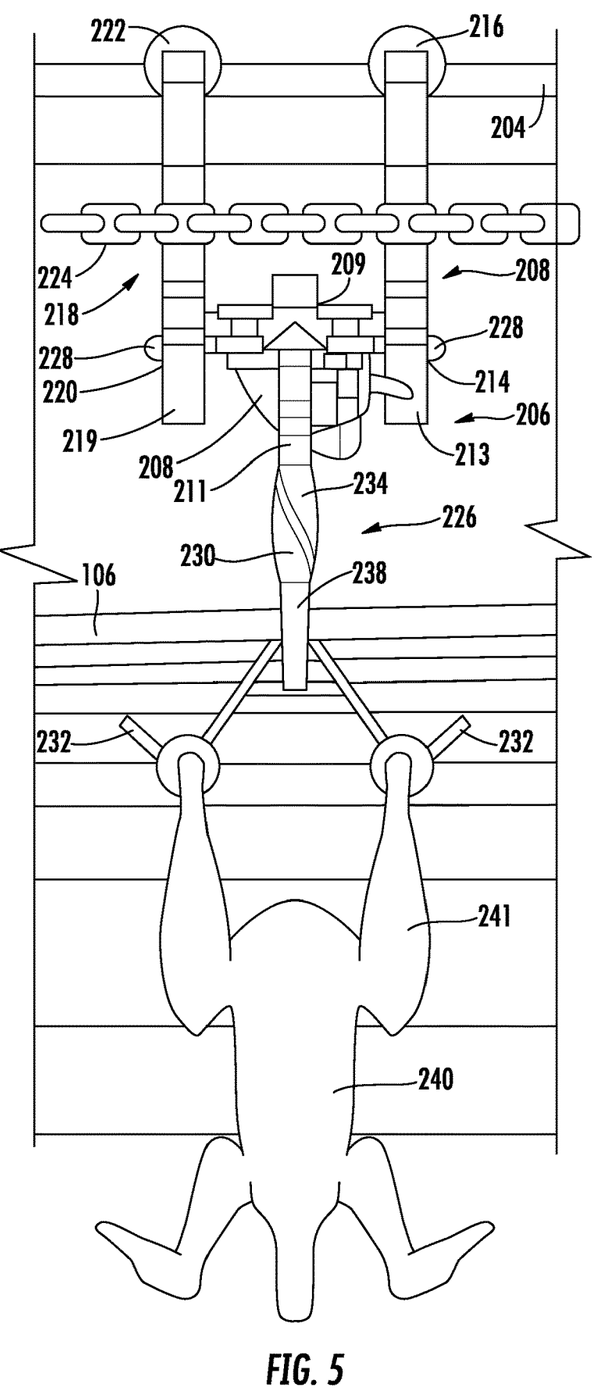
FIG. 5 is an elevation view of an embodiment of the shackle.
Figure 6:
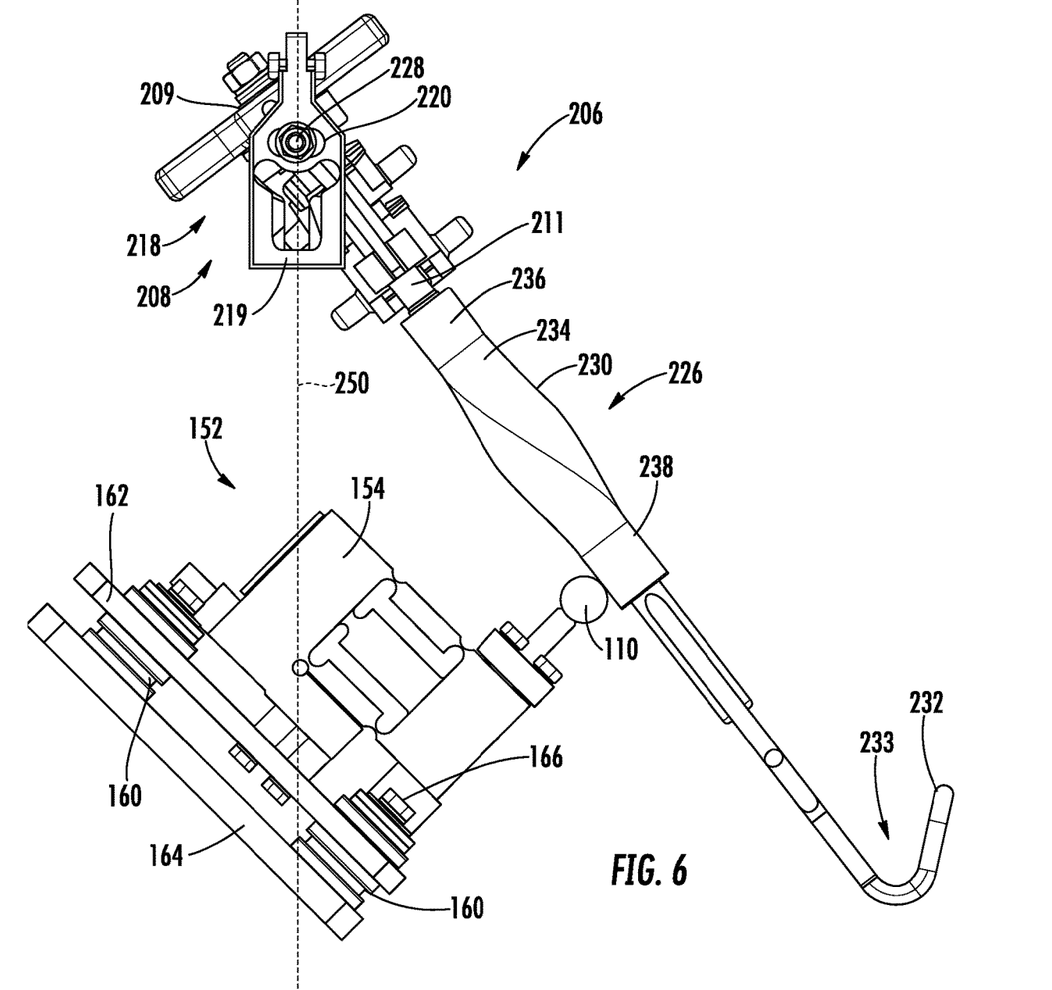
FIG. 6 is an end view of an embodiment of the shackle and weigh apparatus.
Figure 7:
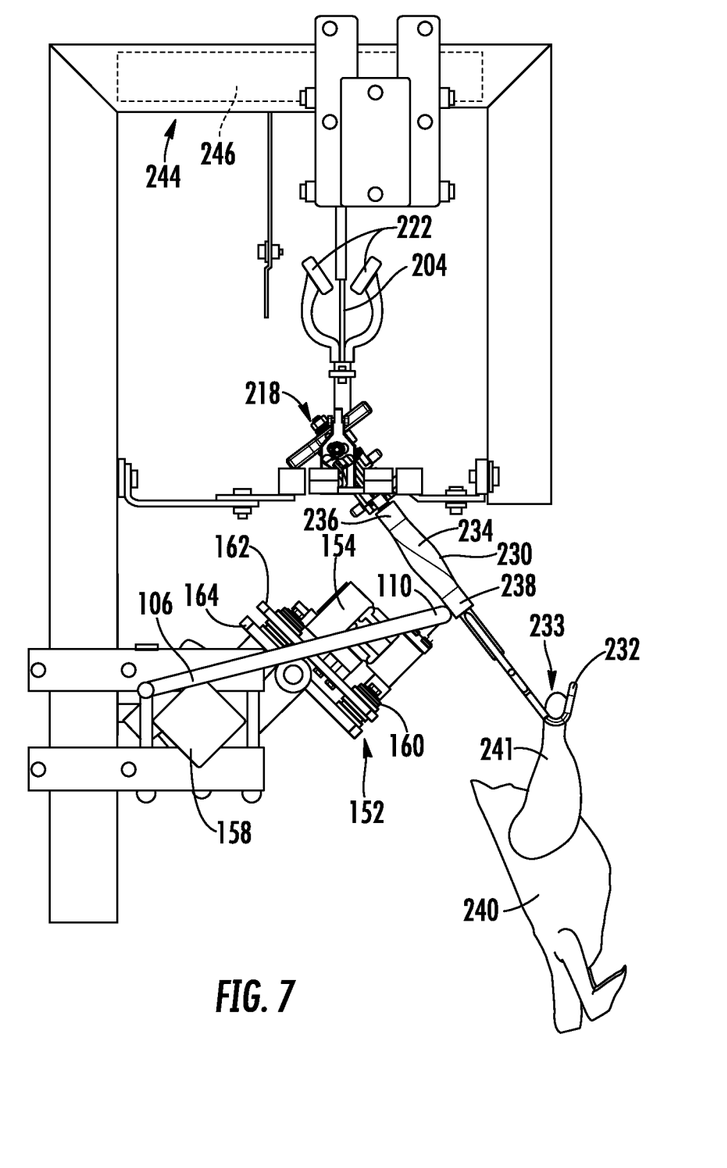
FIG. 7 is an end view of an embodiment weigh apparatus with a poultry carcass.
Figure 8:
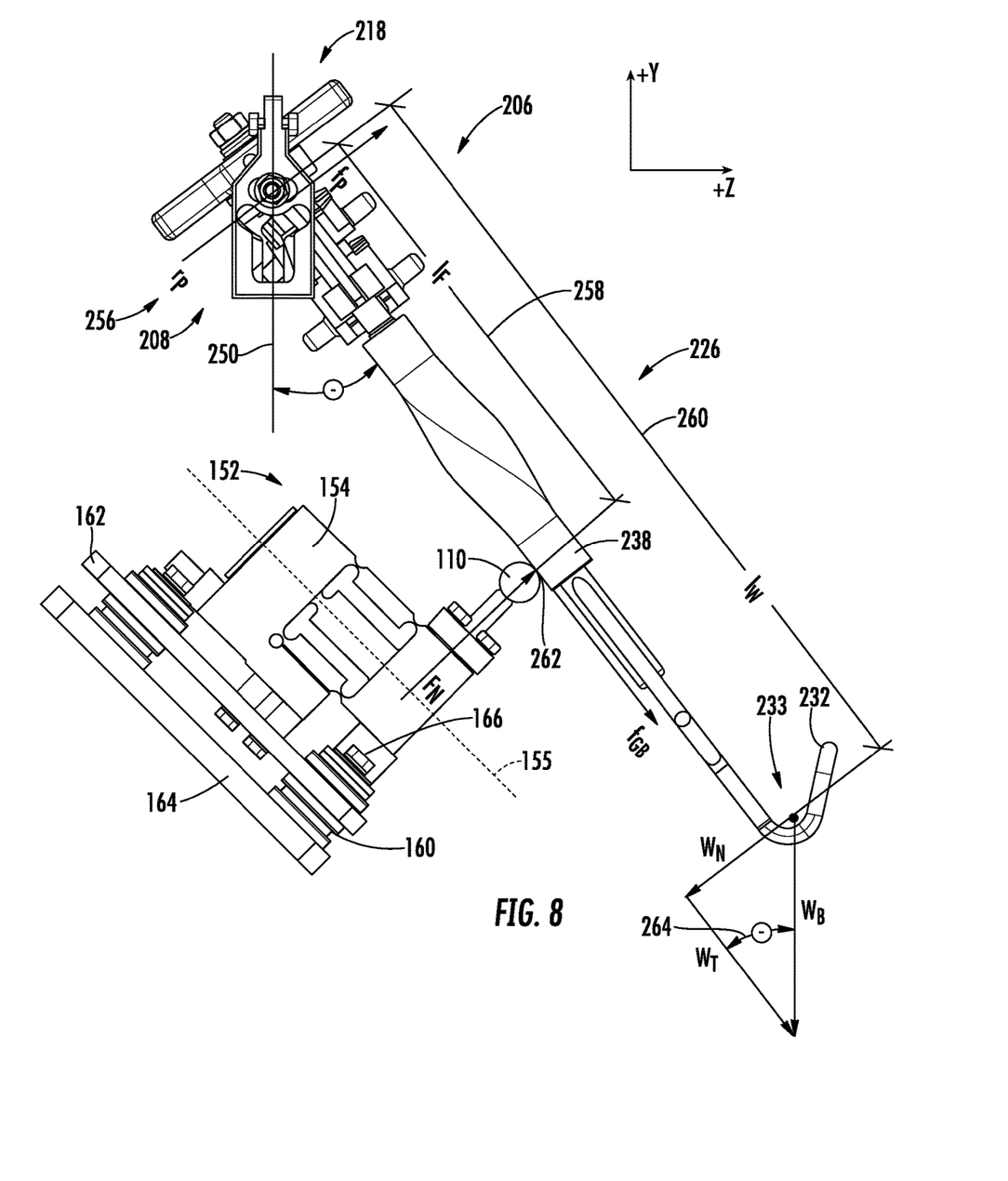
FIG. 8 is an end view of an embodiment of the shackle and weigh apparatus.

Characteristics of the components of the shackle assembly 206 and weighing apparatus 152 are factored into an equation to determine the weight of the poultry carcass 240 as the shackle 226 moves across the second segment 110. The characteristics, including friction, dimensions, lengths, angles, and weights are discussed below. Referring to FIG. 8, the shackle assembly 206 has pivot points at the apertures 214, 220 where the crossbar 228 contacts the arms 213, 219 respectively. A cross section of the circular crossbar 228 has a reference dimension 256 that is the radius of the pivot point ($r_P$). Rotation of the crossbar 228 within the apertures 214, 220 is affected by the friction ($f_P$) created by the contact between the materials. In an implementation, the crossbar 228 is stainless steel, and arms 213, 219 are nylon. The shackle assembly 206 includes a reference dimension 258 that is a length to a fulcrum ($l_F$) and reference dimension 260 that is a length to the weight ($l_W$), the weight principally being the weight of the poultry carcass 240. The length to the fulcrum ($l_F$) is the distance between the center of the pivoting axis (A) also the cross-sectional center of the crossbar 228, and the point of contact 202 between the sleeve 230 force sensor contact 238 and the second segment 110. The length to the weight ($l_W$) is the distance between the cross-sectional center of the crossbar 228 (pivoting axis A) and the saddle 233 of the stirrup 232. The shackle assembly 206 without a poultry carcass 240 attached thereto generates a normal weight ($W_N$) at the stirrups 232 that is counteracted by a normal force ($F_N$) equivalent to the weight detected by the load cell 154, extending perpendicular to the bending axis 155, created by the load cell 154 and second segment 110 acting upon the sleeve 230 at the force sensor contact 238. The friction from the guide bar ($f_{GB}$) is perpendicular to the measuring direction of the load cell 154, the normal force ($F_N$). $W_T$ is the component of the weight perpendicular to the load cell 154, or normal force ($F_N$).

The hocks of the legs 241 reside in the saddle 233 with the weight of the bird ($W_B$) or poultry carcass 240 creating a generally downward force on the shackle assembly 206 in the –Y-axis direction. In an implementation, reference dimension 264 is the angle (θ) defined between the vertical plane 250 and the sleeve 230, and is approximately 45 degrees.

The weight of the poultry carcass 240 as the carcass and shackle assembly 206 move across second segment 110 is determined by the following relationship:

$$W_B = F_N \times l_F / (l_W \sin \theta) \quad [1]$$

where the weight of the bird ($W_B$) or poultry carcass 240 is based on the normal force ($F_N$) or the signal from the load cell.

EXAMPLE

TABLE 1

| Variable | Value |
|---|---|
| $l_F$ | 23 mm |
| $r_P$ | 6 mm |
| $l_W$ | 410 mm |
| Θ | 45° |

Considering an exemplary system with the variable and values listed above in Table 1, formula [1] yields the weight of the bird ($W_B$) or poultry carcass 240 based on the normal force ($F_N$) or the signal from the load cell:

$$W_B = F_N \times 23/(410 \sin 45°)$$

$$W_B = F_N/1.26 \quad [2]$$

From formula [1] the weight error from the friction in the busing is calculated as:

$$F_N = f_P \times r_P / l_F \quad [3]$$

Considering the variable and values listed above in Table 1, formula [2] yields the following:

$$F_N = f_P \times 6/23$$

$$F_N = f_P \times 0.026 \quad [4]$$

Formula [4] can be used in combination with formula [2] to represent weight error from the friction in the bushing in this example, calculated as:

$$\text{error in } WB = f_P \times 0.026/1.26$$

$$\text{error in } WB = f_P \times 0.021 \quad [5]$$

Formula [5] represents that 2.1% of the friction in the bushing is measured as weight. The 2.1% of the friction in the bushing being measured as weight in this example is less than the amount of friction implemented into the conventional method of elevating a shackle and carcass vertically.

As shown by the calculations above, weighing the poultry carcass 240 with the shackle assembly 206 at an angle θ reduces movement within the associated shackle support structures, and thus, the impact of such movement and friction on the resulting weight compared to conventional methods. For example, referring to FIG. 5, weighing the poultry carcass 240 when the shackle assembly 206 is at a 45 degree angle with the second segment 110 contacting the sleeve 230, allows the load cell 154 to detect the weight while decreasing the effect of friction introduced by the headset 208 rotating about apertures 214, 220, or the shackle moving within opening 209, 211. In addition, the width of the force sensor contact 238 relative to the length of the second segment 110 allows the force sensor contact 238 to remain in contact with the load cell 154 for an extended dwell time increasing the accuracy of the detected and calculated weight.

As the force sensor contact 238 exits the weighing apparatus 152 the force sensor contact 238 encounters the third segment 112 and the shackle 226 transitions laterally from the second side rail 116 back to a position beneath the conveyor line 204, in line with the vertical plane 250, exiting the off-line 101 portion, and proceeding downstream along the conveyor line 204 for further processing.

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology used in the description, and shown in the drawings, is not limiting. For example, up, down, front, back, right and left refer to the disclosed subject matter as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning. Elements of the disclosed subject matter that are connected may be directly connected or may be connected through one or more intervening elements.

Although the invention has been disclosed with reference to various particular embodiments, it is understood that equivalents may be employed and substitutions made herein without departing from the scope of the invention as recited in the claims.

Having described the disclosed subject matter, what is claimed is:

1. A weighing apparatus for a conveyor line, the weighing apparatus comprising:
   a force sensor disposed adjacent a vertical plane, the vertical plane extending downward from the conveyor line;
   a segment connected to the force sensor, the segment extending from a first end to a second end, the segment extending parallel to the conveyor line;
   a first rail extending between a first end at the vertical plane beneath the conveyor line and the segment first end;
   a second rail extending between the segment second end and a second end at the vertical plane beneath the conveyor line;
   wherein the first rail, segment, and second rail form an arch between the first rail first end and the second rail second end; and
   a poultry shackle, comprising:
     a force sensor contact;
     wherein the poultry shackle moves on the conveyor line relative to the force sensor; and
     wherein the force sensor contact moves along the segment between the second segment first end and second segment second end.

2. The apparatus of claim 1, further comprising:
   a support member; and
   a first vibration attenuating material disposed between the force sensor and the support member.

3. The apparatus of claim 2, further comprising:
   a second vibration attenuating material;
   wherein the second vibration attenuating element is disposed within the support member.

4. The apparatus of claim 1, further comprising:
   a frame;
   a vibration attenuating material;
   wherein the vibration attenuating material is disposed within the frame;
   wherein the force sensor is connected to the frame; and
   wherein the conveyor line is connected to the frame.

5. The apparatus of claim 1, wherein the force sensor is a load cell.

6. The apparatus of claim 1, further comprising:
   wherein the vertical plane is parallel to an XY plane;
   wherein the force sensor has a bending axis plane extending from the XY plane, the bending axis plane formed parallel to a ZX plane in a +Z-axis direction; and
   wherein a downward angle formed between the vertical plane and the bending axis plane is an acute angle.

7. The apparatus of claim 6, wherein the downward angle is approximately forty-five degrees.

8. A weighing apparatus for a conveyor line, the weighing apparatus comprising:
   a force sensor disposed adjacent a vertical plane, the vertical plane extending downward from the conveyor line; and
   a diverter assembly for guiding a poultry shackle to the force sensor, wherein the diverter assembly comprises a first side rail member extending from the vertical plane.

9. The apparatus of claim 8, further comprising a segment connected to the force sensor, the segment extending from a first end to a second end, the segment extending parallel to the conveyor line.

10. The apparatus of claim 9, further comprising:
    a poultry shackle, comprising:
    a force sensor contact; and
    wherein the force sensor contact moves along in contact with the segment between the segment first end and segment second end.

11. The apparatus of claim 8, wherein the first side rail member extends to the force sensor.

12. The apparatus of claim 8, further comprising:
    wherein the vertical plane is parallel to an XY plane;
    wherein the force sensor has a bending axis plane extending from the XY plane, the bending axis plane formed parallel to a ZX plane in a +Z-axis direction; and
    wherein a downward angle formed between the vertical plane and the bending axis plane is an acute angle.

13. The apparatus of claim 12, wherein the downward angle is approximately forty-five degrees.

14. A weighing apparatus for a poultry processing conveyor line, the apparatus comprising:
    a support member connected to the poultry processing conveyor line;
    a vertical plane extending downward from the poultry processing conveyor line parallel to an XY plane;
    a force sensor connected to the support member, the force sensor disposed adjacent the vertical plane;
    a segment connected to the force sensor, the segment extending from a first end to a second end, the segment extending parallel to the conveyor line;
    wherein the force sensor has a bending axis plane extending from the XY plane, the bending axis plane formed parallel to a ZX plane in a +Z-axis direction;
    wherein a downward angle formed between the vertical plane and the bending axis plane is an acute angle; and
    a diverter assembly, comprising:
      a first rail connected to the support member, the first rail extending between a first end adjacent the vertical plane beneath the conveyor line and the segment first end;
      a second rail connected to the support member, the second rail extending between the segment second end and a second end adjacent the vertical plane beneath the conveyor line; and
      wherein the first rail, segment, and second rail form an arch between the first rail first end and the second rail second end.

15. The apparatus of claim 14, further comprising a vibration attenuating material separating the force sensor and the support member.

16. The apparatus of claim 14, further comprising:
    a plurality of poultry shackles connected to the poultry processing conveyor line, each poultry shackle comprising:
      a support rolling engaging the conveyor line;

a shackle pivotally engaging the support, the shackle extending from the support forming a force sensor contact;

wherein the force sensor contact moves along the segment between the segment first end and segment second end in contact with the segment.

* * * * *